United States Patent [19]

Mulholland

[11] 4,392,668

[45] Jul. 12, 1983

[54] SHOCK-ABSORBING WHEEL SUSPENSION ASSEMBLY

[76] Inventor: Lawrence K. Mulholland, 416 Mara St., Ventura, Calif. 93004

[21] Appl. No.: 214,485

[22] Filed: Dec. 9, 1980

[51] Int. Cl.³ .............................................. B60G 11/18
[52] U.S. Cl. ........................................ 280/721; 16/44; 280/11.23; 280/688
[58] Field of Search .............. 280/721, 688, 78, 11.23, 280/11.28; 16/44

[56] References Cited

U.S. PATENT DOCUMENTS

| | | | |
|---|---|---|---|
| 2,557,275 | 6/1951 | Geisse | 16/44 |
| 2,923,961 | 2/1960 | Black | 16/44 |
| 2,987,752 | 6/1961 | Black | 16/44 |

Primary Examiner—Richard A. Bertsch
Attorney, Agent, or Firm—John H. Mulholland

[57] ABSTRACT

The improved shock-absorbing wheel suspension assembly of the present invention comprises a rigid yoke having a generally upstanding neck and a pair of downwardly diverging hollow tubular sleeves connected to the lower end of the neck, both sleeves being directed either rearwardly or forwardly relative to the neck. A pair of flexible resilient lever support arms are provided which have their upper ends extending into the sleeves. Their middle portions are generally parallel to each other and extend downwardly and in the same rearward or forward direction as the sleeves. The lower ends of the arms are angled to approximate each other in an about horizontal plane and are secured in the central hub of a wheel disposed therebetween. Thus, the wheel is disposed rearwardly or forwardly of the yoke and is adapted for rotation on an axle formed by the lower ends of the arms. The neck is connected to an upwardly extending stem, in turn connectable to the underside of the body of a vehicle or the like. During normal transport of the vehicle and rotation of the wheel, temporary displacements of the wheel occur, due to road shocks (rough roads, running over obstacles, etc.) Such shocks are effectively absorbed, dampened and minimized, since the middle portions of the arms flex and bow and undergo considerable torque. Thus, the assembly provides effective shock absorption through a simple, durable arrangement of components.

11 Claims, 3 Drawing Figures

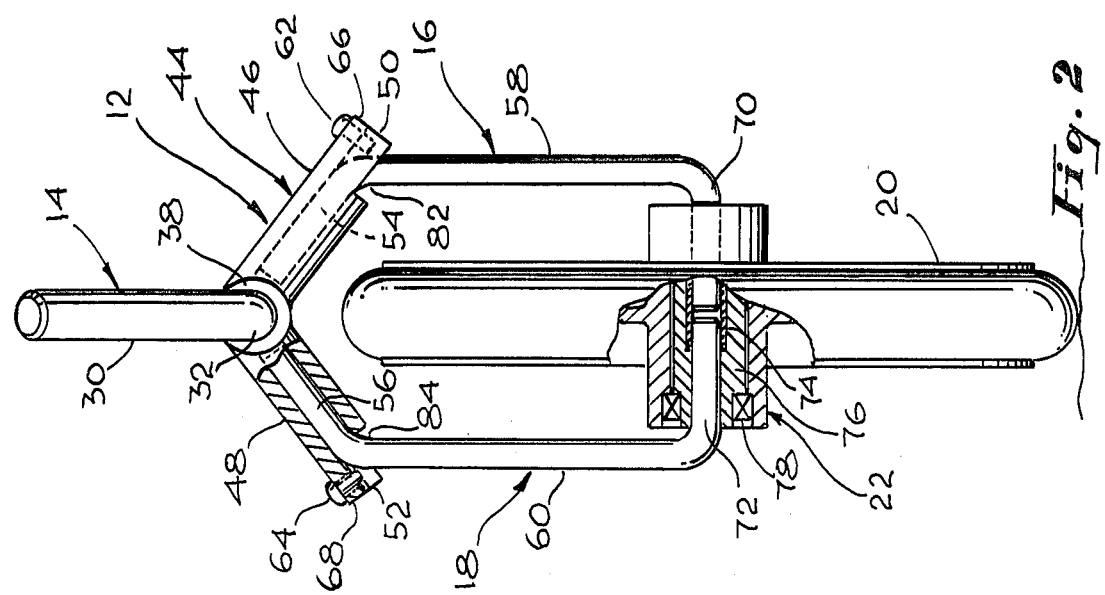
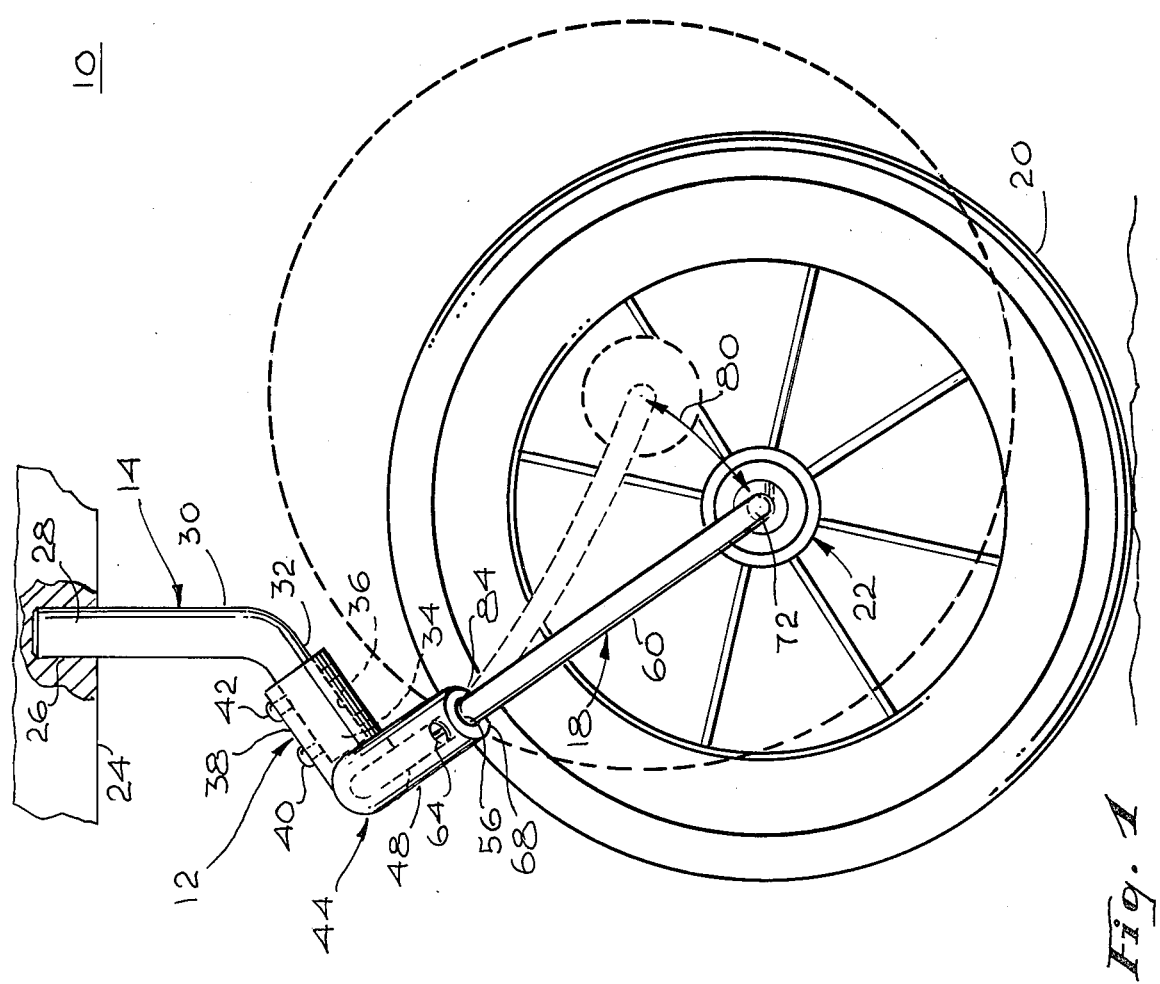

SHOCK-ABSORBING WHEEL SUSPENSION ASSEMBLY

BACKGROUND OF THE INVENTION

1. Field of the Invention

The present invention generally relates to suspension means and more particularly, an improved shock-absorbing wheel suspension assembly.

2. Prior Art

Many types of shock absorbers have been devised for vehicles. Most such shock absorbers are complicated in construction and are utilized as separate devices in addition to wheel axles and other components comprising the primary wheel suspension system for the vehicle. Moreover, the shock absorbers normally absorb shocks through the use of a single mechanism or mode of operation, e.g. resilient compression in a single plane and are subject to considerable wear and stress. Many smaller types of vehicles, such as wheeled cots, stretchers and wheel chairs incorporate ineffective or literally no shock-absorbing means whatsoever, although shock dampening means would be desireable for the same.

U.S. Pat. No. 3,057,642 discloses a novel type of wheel suspension apparatus which incorporates directly thereinto improved shock absorbing means. This shock absorbing means comprises a considerable number of interconnected components carefully fitted together to cause shock absorption and force dissipation by two separate mechanisms; namely, linear bending and torsional stressing. However, the apparatus is somewhat complicated in construction and expensive to build and maintain. Accordingly, it would therefore be desireable to be able to provide an improved unitary, simple shock absorbing wheel suspension assembly suitable for a wide variety of uses, which assembly would be less complicated and less expensive to construct and maintain.

SUMMARY OF THE INVENTION

The improved shock absorbing wheel suspension assembly of the present invention satisfies the foregoing needs. It is substantially as set forth in the Abstract above. It comprises a rigid yoke with upstanding neck and a downwardly diverging pair of sleeves, also directed forwardly or rearwardly of the neck and a flexible pair of lever support arms, the upper ends of which are disposed in the sleeve and the middle portions of which are parallel to each other and directed in the same rearward or forward direction as the sleeves. The lower ends of the support arms are angled toward each other and are disposed in the hub of a wheel from opposite sides thereof. The assembly may include an upstanding stem connected to the yoke neck and connectable to the underside of a vehicle body. The yoke may be a simple unitary metal casting or the like and each arm may be formed of a single rod of flexible steel or the like. Thus, the assembly provides both suspension and shock-absorbing means in a simple inexpensive efficient construction.

The assembly can have the wheel located in front of or behind the yoke and stem. Shocks transmitted to the vehicle body during movement of the assembly, as a result of sudden upward displacements of the wheel caused by road bumps, etc., are substantially and effectively dampened and absorbed due to simultaneous linear bending and torsional stressing of the lever arms themselves. Thus, the wheel during such displacement travels upwardly in an arc carrying with it the lower ends of the arms. The center of rotation for this is located in about the point of which each lever arm enters its associated sleeve. However, since the two sleeves are sloped downwardly and away from each other, this wheel displacement also simultaneously causes each arm to undergo twisting or torsional stress the combined flexing and torsion of the arms effectively dampen and absorb the road shocks. To assist insertion of the arms into the sleeves and limit the degree of rotation of the arms, each sleeve is cut away a predetermined amount at its lower end. Further features of the assembly are set forth in the following detailed description and accompanying drawings.

BRIEF DESCRIPTION OF THE DRAWINGS

FIG. 1 is a schematic side elevation, partly broken away, of a first preferred embodiment of the improved shock absorbing wheel suspension assembly of the present invention showing the assembly attached to the underside of a vehicle body, and also showing the path of deflection of the wheel when subjected to road shocks and the like;

FIG. 2 is a schematic front elevation, partly broken away and partly in section, of the assembly of FIG. 1.

DETAILED DESCRIPTION OF THE PREFERRED EMBODIMENT

Figure 3:
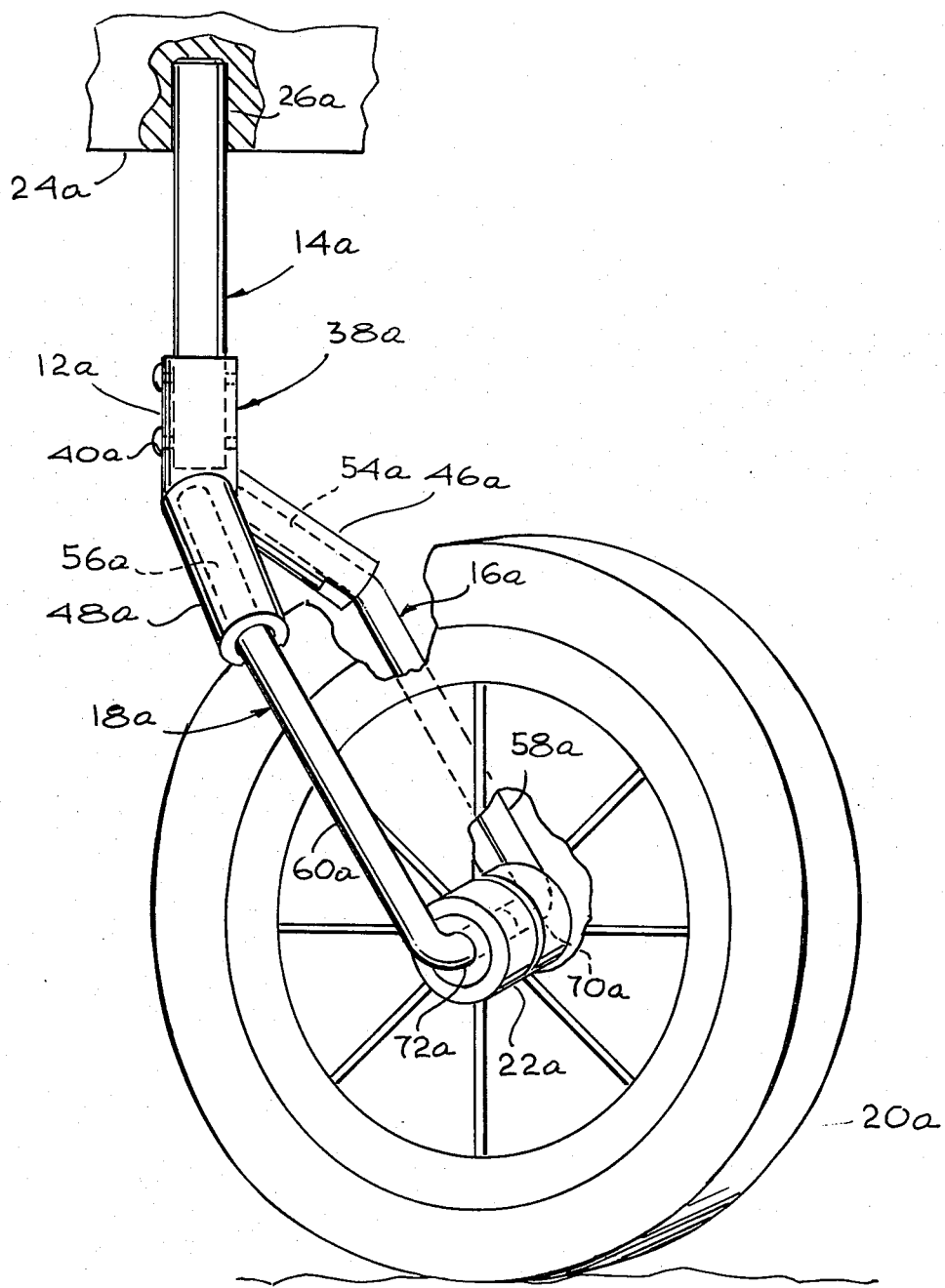
FIG. 3 is a schematic perspective view, partly broken away, of a second preferred embodiment of the improved shock absorbing wheel suspension assembly of the present invention, showing the assembly attached to the underside of a vehicle body.

Now referring more particularly to FIGS. 1 and 2 of the accompanying drawings, a first embodiment of the improved shock-absorbing wheel suspension assembly of the invention is schematically depicted therein. Thus, assembly 10 is shown which comprises a yoke 12, cylindrical stem 14, arms 16 and 18 and wheel 20 with control hub 22. Also shown is the underside of the body portion 24 of a vehcile (not shown) bearing a socket 26 into which the upper end 28 of stem 14 is received, preferably for rotation.

The upper portion 30 of stem 14 may be cylindrical and is vertical while the lower portion 32 thereof is angled therefrom with the lower end 24 thereof inserted into a cavity 36 in the angled upper portion or neck 38 of yoke 12 and releasably secured therein, as by spring pins 40 and 42 (FIG. 1) or the like.

The lower portion 44 of yoke 12 comprises a pair of hollow tubular sleeves 46 and 48 which extend downwardly and rearwardly or forwardly from neck 38 at about a 90° angle, although other angles substantially less than 180° are acceptable. Yoke 12 preferably is forged or cast of a single rigid piece of steel or the like into a unitary body.

Sleeves 46 and 48 preferably diverge from each other at about a 90° angle (FIG. 2), although other angles are also acceptable. Sleeves 46 and 48 define central cylindrical passageways 50 and 52, respectively, within which the upper ends 54 and 56 respectively of flexible resilient cylindrical lever arms 16 and 18 are disposed. Preferably arms 16 and 18 are fabricated of high tensile strength steel rod or the like. Ends 54 and 56 preferably converge within yoke 12 at the base of neck 38. Ends 54 and 56 are angled relative to the elongated middle portions 58 and 60 of arms 16 and 18, respectively, as shown in FIG. 2, which portions 58 and 60 are parallel to each other. Rivets 62 and 64 or other means such as screws, etc. (not shown), may be disposed through the sleeve wall at the lower ends 66 and 68 of sleeves 46 and 48, respectively, to prevent ends 54 and 56 from sliding out of sleeves 46 and 48.

When viewed from the side (FIG. 1), it can be seen that portions 58 and 60 lie in the same angled plane as sleeves 46 and 48 and thus extend downwardly and rearwardly to lower ends 70 and 72 thereof. Ends 70 and 72 are angled to approximate each other in the horizontal plane and are releasably secured in opposed ends of horizontal hub 22 of vertical wheel 20 by any suitable means, such as for example, in each instance, a spanner 74 configured sleeve 76 and bearing and race assembly 78. The wheel 20 is thus free to rotate around the axle formed of ends 70 and 72 of arms 16 and 18 while ends 70 and 72 remain in fixed relation thereto.

When assembly 10 is secured to body 24, as shown in FIG. 1, wheel 20 is largely behind yoke 12 with wheel 20 centered between sleeves 46 and 48 (FIG. 2) and preferably in the same vertical plane as stem 14 and neck 38. When body 24 is moved so that wheel 20 rotates, shocks due to uneven ground, etc., which are transmitted to wheel 20 cause it to deflect upwardly along an arc 80 (FIG. 1) the center of rotation of which is at about the lower ends 66 and 68 of sleeves 46 and 48. For example, wheel 20 can be deflected to the position shown in dotted outline in FIG. 1. Ends 70 and 72 are connected thereto and move therewith.

Ends 66 and 68 of sleeves 46 and 448 are cut away in the areas designated 82 and 84 in FIGS. 1 and 2 to facilitate initial insertion of ends 54 and 56 in sleeves 46 and 48 during construction of assembly 10, and limit the angular rotation of arms 16 and 18. Linear flexing and bending of arms 16 and 18 occurs along the length of middle portions 58 and 60 thereof to absorb the deflecting force transmitted thereto. Moreover, since ends 54 and 56 of arms 16 and 18 are angled away from the plane of rotation of the portion 58 and 60 of arms 16 and 18 the described linear flexing is accompanied by torsional stressing or twisting of arms 16 and 18 in the area of the juncture of ends 54 and 56 with middle portions 58 and 60 and for some distance therebeyond. This has an additional deflection damping effect, further absorbing and minimizing the shock transmitted through assembly 10 to body 24. Since lower ends 70 and 72 are confined to the plane of arms 16 and 18 and upper ends 54 and 56, additional shock absorption takes place by torsional stressing at the junction of lower ends 70 and 72 and arms 16 and 18 respectively. Wheel 20 returns to its undeflected position as arms 16 and 18 recoil from the deflecting in each instance for smooth movement of body 26. Accordingly, the desired wheel suspension and effective shock absorbing results are obtained with a simple durable assembly.

A modified version of assembly 10 is shown schematically in perspective view in FIG. 3. Components shown therein which are similar to those of assembly 10 as shown in FIGS. 1 and 2 bear the same numerals but are succeeded by the letter "a". Thus, assembly 10a is shown which includes vertical stem 14a connected to the body 26a and to a vertical neck 38a of yoke 12a. Yoke 12a includes downwardly and forwardly diverging sleeves 46a and 48a within which are received upper ends 54a and 56a of resilient flexible arms 16a and 18a, respectively, the middle portions 58a and 60a of arms 16a and 18a, respectively, being parallel to each other extending forwardly and terminating in lower ends 70a and 72a which are angled into the horizontal plane so as to approximate each other. Ends 70a and 72a are secured in opposite sides of hub 22a for rotation of wheel 20a in a vertical plane therebetween.

Thus, assembly 10a differs in construction from assembly 10 only in that neck 38a is vertical rather than angled, sleeves 46a and 48a do not have cut-away portions on their lower ends, legs 16a and 18a are directed forwardly rather than rearwardly and ends 54a and 56a are not pinned or riveted into sleeves 46a and 48a but are free to slide thereon. However, the wheel suspending and shock absorbing properties of assembly 10a are substantially the same as those already described for assembly 10 and the two assemblies function similarly. Both are very inexpensive to make and maintain, durable and efficient and are adaptable to a wide variety of applications. Both can be constructed of similar materials.

Various changes, modifications, alterations and additions can be made in the assembly of the present invention, its components and their parameters. All such modifications, additions, alterations and changes as are within the scope of the appended claims form part of the present application.

What is claimed is:

1. An improved torsionally shock-absorbing wheel suspension assembly, said assembly comprising, in combination:
   a. a rigid yoke having a generally upwardly extending neck and a pair of downwardly diverging hollow tubular sleeves connected to the lower end of said neck, both of said sleeves being directed either rearwardly or forwardly relative to said neck;
   b. a pair of flexible torsion resilient lever support arms, the upper ends of which extend into said sleeves, the elongated middle portions of which are generally parallel to each other and extend downwardly and in the same rearward or forward direction as said sleeves relative to said neck and the lower ends of which arms are angled to approximate each other in an about horizontal plane; and
   c. a wheel disposed between said lower ends with a central hub which receives and holds said lower ends of said arms in a fixed position relative to said hub, whereby upward deflection of said wheel exerts flexing and torquing of said flexible torsionally resilient arms to effect effective shock absorption by said assembly.

2. The improved assembly of claim 1 wherein said assembly includes an upwardly extending stem secured adjacent its lower end of said yoke and securable adjacent its upper end to a vehicle carriage.

3. The improved assembly of claim 2 wherein the lower end of said stem is slideably received within said neck and secured thereto.

4. The improved assembly of claim 2 wherein said upper ends of said arms are releasably secured in said sleeves.

5. The improved assembly of claim 2 wherein said neck extends upwardly at an angle to the vertical and to said sleeves.

6. The improved assembly of claim 5 wherein said neck extends upwardly at an angle of less than 180° relative to said sleeves.

7. The improved assembly of claim 6 wherein said neck extends upwardly at about a 90° angle relative to said sleeves.

8. The improved assembly of claim 7 wherein said stem is slideably received and secured to said neck and is angled such that the upper portion thereof is generally vertical.

9. The improved assembly of claim 1 wherein said yoke is of unitary integral construction and wherein each said sleeve is provided with a cut away portion at the lower end thereof to facilitate insertion of said upper ends of said arms in said sleeves and non-bending movement of said portions of said arms during shock absorption thereby.

10. An improved torsional shock absorber assembly comprising:
   a. a pair of torsion arms;
   b. each arm having a mid-portion, an upper extension and a lower extension;
   c. said lower extension lying at substantially right angles to said mid-portion;
   d. said upper extension lying at an angle other than at a right angle to said mid-portion;
   e. said torsion arms being disposed in said assembly so that said upper and lower extensions are directed inwardly towards one another; and
   f. means to continuously confine said arm and upper and lower extensions in a single plane, including:
      (1) a rigid yoke adapted to be attached to a vehicle and having a plurality of sleeves adapted to receive said upper extensions while enabling rotational movement therein of said upper extensions, and
      (2) a hub adapted to rotatably retain a wheel therein and receive therein said lower extensions.

11. The assembly of claim 10 wherein means are provided to limit the angle of deflection of said hub in a plane perpendicular to said single plane about an axis lying in said single plane.

* * * * *